US009298681B2

(12) United States Patent
Ahmed et al.

(10) Patent No.: US 9,298,681 B2
(45) Date of Patent: Mar. 29, 2016

(54) DYNAMIC WEBPAGE CHANGE ANIMATION

(71) Applicant: International Business Machines Corporation, Armonk, NY (US)

(72) Inventors: Maryam Ahmed, Vaughan (CA); Matthew C. Hillary, Kihei, HI (US); Kimberly D. McCall, Leander, TX (US); Michael S. Thomason, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 13/733,165

(22) Filed: Jan. 3, 2013

(65) Prior Publication Data

US 2014/0189490 A1   Jul. 3, 2014

(51) Int. Cl.
*G06F 17/22* (2006.01)

(52) U.S. Cl.
CPC .................................. *G06F 17/2288* (2013.01)

(58) Field of Classification Search
CPC ... G06F 3/048; G06F 3/04817; G06F 3/0482; G06F 3/0484; G06F 9/4418; G06F 17/2288
See application file for complete search history.

(56) References Cited

U.S. PATENT DOCUMENTS

| | | | |
|---|---|---|---|
| 5,379,375 A | 1/1995 | Dao et al. | |
| 5,898,836 A | 4/1999 | Freivald et al. | |
| 7,386,802 B2 | 6/2008 | Gaudette | |
| 7,559,016 B1 | 7/2009 | Rakowski et al. | |
| 7,571,391 B2 | 8/2009 | Roessler | |
| 7,765,464 B2 | 7/2010 | Bokor | |
| 7,814,419 B2 | 10/2010 | Fabritius | |
| 2007/0124693 A1* | 5/2007 | Dominowska et al. | 715/772 |
| 2008/0055317 A1 | 3/2008 | Abel et al. | |
| 2009/0037774 A1* | 2/2009 | Rideout et al. | 714/38 |
| 2010/0235769 A1 | 9/2010 | Young et al. | |
| 2013/0124952 A1* | 5/2013 | Frem et al. | 715/202 |
| 2014/0033006 A1* | 1/2014 | Easter et al. | 715/205 |

OTHER PUBLICATIONS

Blakeman, "Tracking Web Page Changes" Last Updated Dec. 23, 2010 [online], [retrieved on Sep. 17, 2012]. Retrieved from the Internet <URL: http://www.rba.co.uk/sources/monitor.htm>.
changedetection.com, "Change Detection—Know when any web page changes" changedetection.com, Copyright 1999-2010 FreeFind.com [online], [retrieved on Sep. 17, 2012]. Retrieved from the Internet <URL: http://www.changedetection.com>.
IBM TBD, "Hypertext Link Navigation with Intelligent Differential Positioning System" Dec. 24, 2001, IP.com [online], [retrieved on Sep. 18, 2012]. Retrieved from: Prior Art Database, IP.com No. IPCOM000015359D.

* cited by examiner

*Primary Examiner* — Kyle Stork
(74) *Attorney, Agent, or Firm* — Edward P. Li

(57) ABSTRACT

A method, computer program product, and computer system for dynamic webpage change animation. A computer system detects one or more items that are changed on a second version of a webpage relative to a first version of the webpage. The computer system determines an animation order based on user environment. And, on the first version of the webpage and a template for generating the second version of the webpage, the computer system animates changes of the one or more items, according to the animation order.

17 Claims, 11 Drawing Sheets

FIG. 3

Support home
Support for my selected products

Your customized support experience
To modify the contents of this page, choose your products and a page — 301 — Go to quick start
Search support and downloads
[ Within my selected ▼ ]

— 302 — Choose a product
- Find a product
View content for product(s)
All Active
● WebSphere Application Server

Featured links  — 305
▶ WebSphere Applications Server
→ Support technical exchanges
→ Featured documents
→ WebSphere Application Server Performance
→ Steps to getting support
→ Evaluate: IBM WebSphere Application Server
More ›

Flashes and alerts
Alerts: Latest security bulletins
▶ WebSphere Application Server
April 26: Security bulletin 1 . . . .
Feb 10: Security bulletin 2 . . . .
Dec 22: Security bulletin 3 . . . .
Oct 1: Security bulletin 4 . . . .
More ›

— 304 — Technical Support Services
Self-Assessment tool
This tool will help you identify potential gaps and areas for improvement in your IT infrastructure support
→ Access the tool

Notifications
Subscribe: Get personalized updates for product support. More …

— 303 —
Sign in
To access your authorized content and to customize your pages.

Translate this page
Customize this page
Support resources
Contact support
Buy Support & Services
Other IBM pages
Product and brand links
Site availability
Site news
Support feedback
Other IBM pages
Product and brand links
Site availability
Site news
Support feedback

DYNAMIC WEBPAGE CHANGE ANIMATION

FIELD OF THE INVENTION

The present invention relates generally to webpage user interface, and more particularly to dynamic webpage change animation.

BACKGROUND

Changes on webpages are frequently made over time. New features and items, such as search boxes and links, may be added on new versions of the webpages. Items may have different locations on new versions of the webpages relative to old versions. Some items on old versions of webpages may be removed from new versions. These changes on webpages often cause a user to spend much time to become accustomed to the new versions of the webpages. To create materials or presentations for tutoring users about the changes can be time consuming. In addition, users may spend much time to go through the tutoring materials or presentations.

SUMMARY

Embodiments of the present invention provide a method, computer program product, and computer system for dynamic webpage change animation. A computer system detects one or more items that are changed on a second version of a webpage relative to a first version of the webpage. The computer system determines an animation order of changing the one or more items, based on user environment. And, on the first version of the webpage and a template for generating the second version of the webpage, the computer system animates changes of the respective one or more items, according to the animation order.

BRIEF DESCRIPTION OF THE SEVERAL VIEWS OF THE DRAWINGS

FIG. 3 is an example of an animation order of changing items on a webpage, in accordance with an exemplary embodiment of the present invention.

FIGS. 4A-4G illustrate an example of dynamic webpage change animation of different items in the animation order shown in FIG. 3, in accordance with an exemplary embodiment of the present invention.

DETAILED DESCRIPTION

Figure 1:
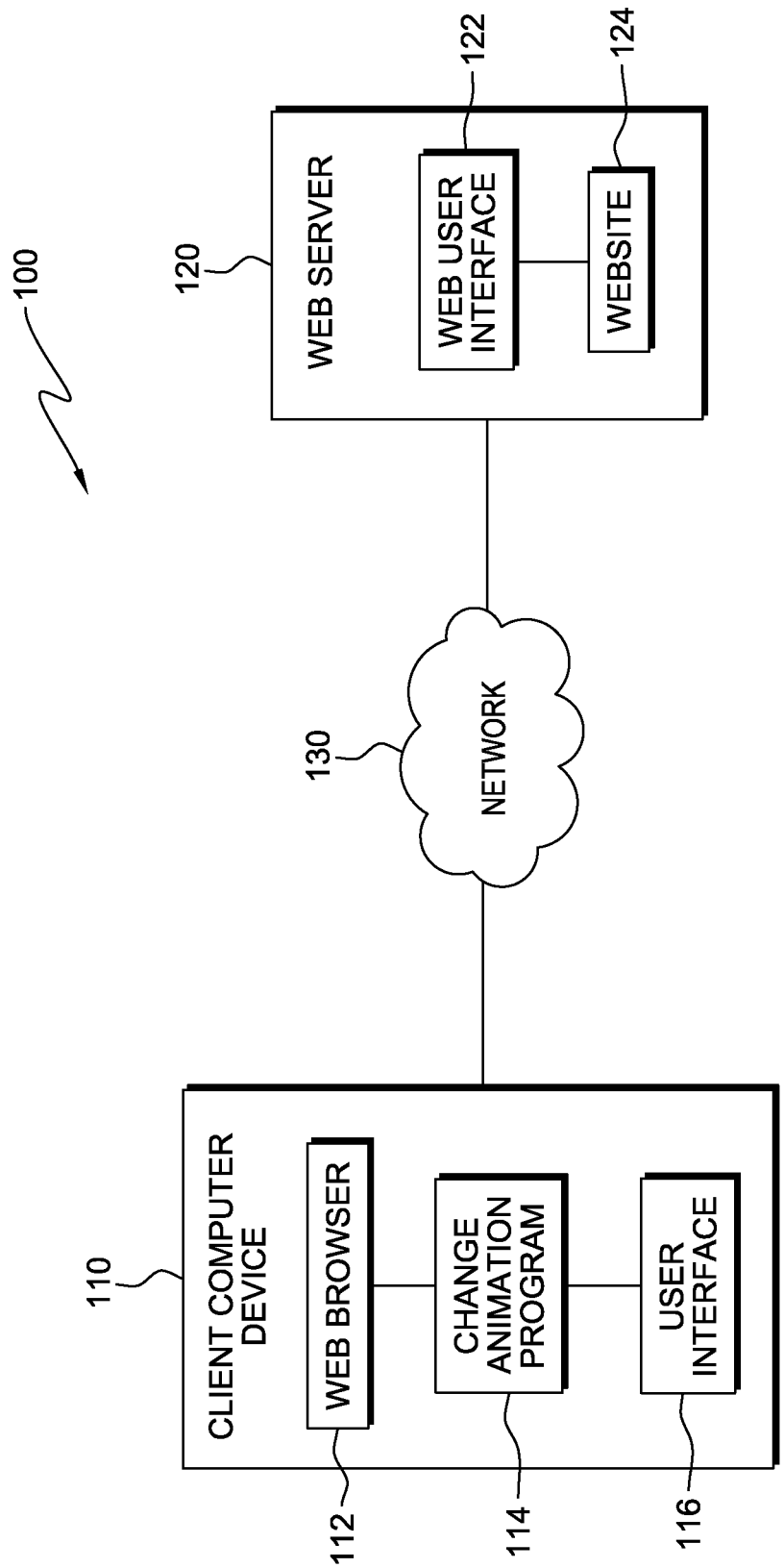
FIG. 1 is a diagram illustrating a system for dynamic webpage change animation, in accordance with an exemplary embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a diagram illustrating system 100 for dynamic webpage change animation, in accordance with an exemplary embodiment of the present invention. System 100 comprises client computer device 110, web server 120, and network 130 which connects client computer device 110 and web server 120. Client computer device 110 includes web browser 112, change animation program 114 for animating changes of items on a second or new version of a webpage relative to a first or previous version of the webpage, and user interface 116. Web server 120 includes web user interface 122 to process requests of client computer device 110 for requested webpages hosted on website 124.

Change animation program 114 on client computer device 110 operates in conjunction with web browser 112. While change animation program 114 in the exemplary embodiment is a separate component, change animation program 114 in other embodiments may be fully integrated with web browser 112. In response to that client computer device 110 receives the second or new version of the webpage, change animation program 114 detects one or more items (e.g. HTML forms, links, etc) on the second or new version of the webpage that are changed. The changes of the one or more items on the second or new version of the webpage is relative to the first or previous version of the webpage most recently visited by a user of client computer device 110. The changes of the one or more items include adding one or more new items on the new version of the webpage, excluding from the second or new version of the webpage one or more items which are on the first or previous version, or changing previous item locations on the first or previous version to new item locations on the second or new version of the webpage. Change animation program 114 animates the changes on the second or new version of the webpage relative to the first or new version of the webpage. To detect changed items and to animate the changes, change animation program 114 uses history data of the webpage cached on client computer device 110 or logged on web server 120. The speed of animating the changes is adjusted by settings of change animation program 114. The settings of change animation program 114 can be configurable by the user of client computer device 110. The speed of animating the changes can be also adjusted by the user during a runtime of change animation program 114. Based on one or more factors of user's knowledge, current context, and applications in use, change animation program 114 determines an animation order of changing the one or more items. When more than one of the factors is used for determining the animation order, change animation program 114 gives different weights to the different factors or prioritizes the factors. The weights or how to prioritize the factors are controlled by a user through configuring the settings of change animation program 114 or through runtime control. Operational steps of change animation program 114 are discussed in great detail in later paragraphs with reference to FIG. 2.

Web browser 112 on client computer device 110 is a program that enables users to view, watch, or listen to documents and other resources, such as audio and video files, retrieved from a network device. In the exemplary embodiment, web browser 112 requests for webpages, identified by their URLs (uniform resource locators), from web server 120 via network 130. Web browser 112 on client computer device 110 transmits requests to web user interface 122 on web server 120 for the webpages contained on website 124 hosted by web server 120. Web user interface 122 responds to the requests by retrieving the webpages from website 124 and transmitting them back to web browser 112. User interface 116 on client computer device 110 includes components used to receive input from a user and transmit the input to web browser 112 and/or change animation program 114.

In the exemplary embodiment, change animation program 114 is on the client side, i.e., client computer device 110. However, in other embodiments, change animation program 114 is on the server side, i.e., web server 120.

Figure 2:
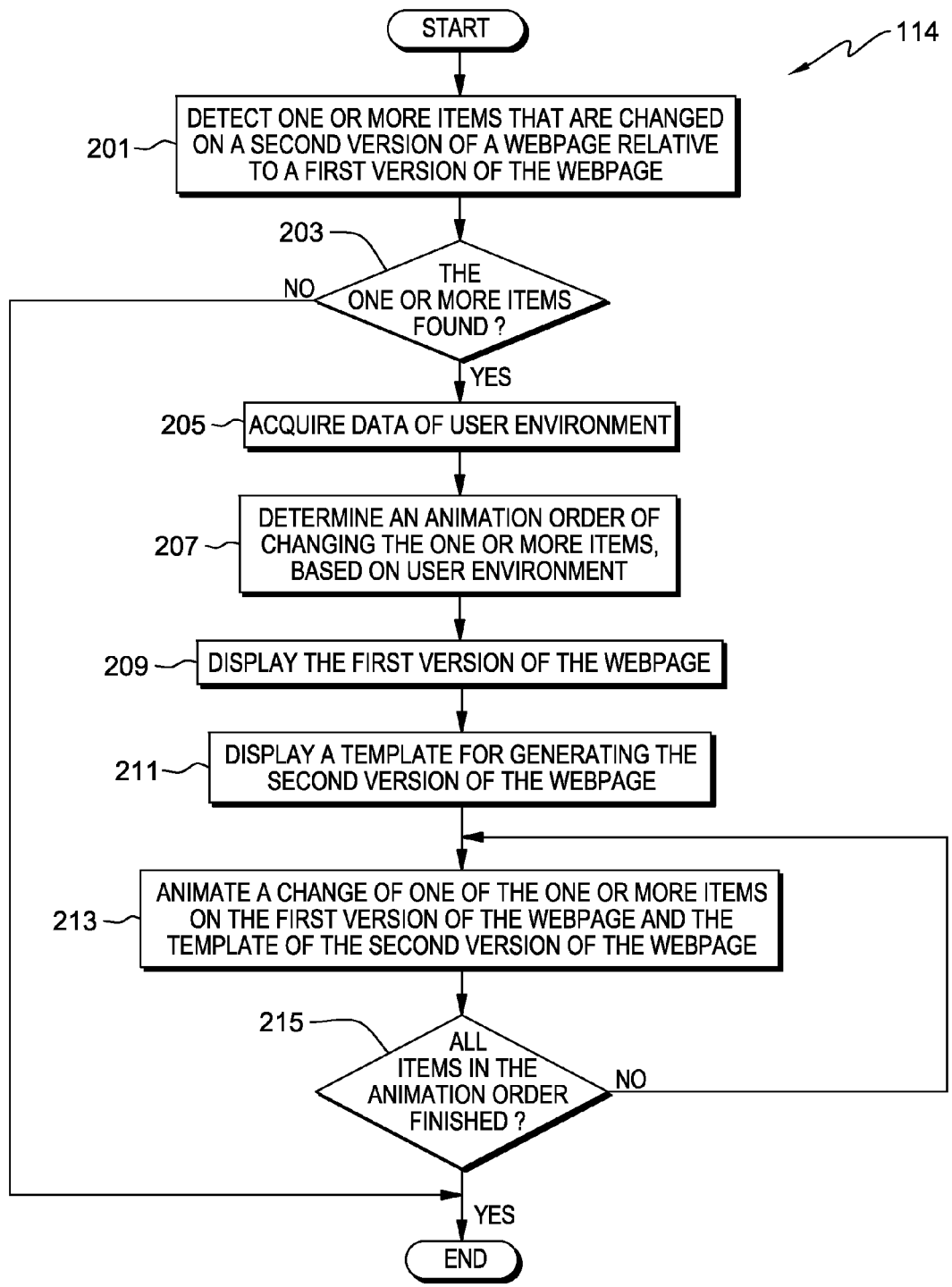
FIG. 2 is a flowchart illustrating operational steps of dynamic webpage change animation, in accordance with an exemplary embodiment of the present invention.

FIG. 2 is a flowchart illustrating operational steps of dynamic webpage change animation, in accordance with an exemplary embodiment of the present invention. The operational steps of dynamic webpage change animation are implemented by change animation program 114. At step 201, change animation program 114 detects one or more items that are changed on the second (or new) version of the webpage. The change of the one or more items on the second (or new) version of the webpage is relative to a first (or previous) version of the webpage. The changes of the one or more items include adding one or more new items on the second (or new) version of the webpage, removing from the second (or new) version of the webpage one or more items existing on the first (or previous) version, or changing from previous item locations on the first (or previous) version to new item locations on the second (or new) version of the webpage. Change animation program 114 detects the one or more items that are changed by comparing the first (or previous) and the second (or new) versions of the webpage. When comparing the first (or previous) and the second (or new) versions of the webpage, change animation program 114 retrieves a copy of the first (or previous) webpage cached on client computer device 110 or logged on web server 120.

At decision block 203, change animation program 114 determines whether the one or more items are found. In response to determining that the one or more items are not found (NO branch of decision block 203), change animation program 114 terminates its operation. In response to determining that the one or more items are found (YES branch of decision block 203), at step 205, change animation program 114 acquires data of user environment. The user environment includes at least one of context, keywords, and applications currently used by a user. At step 207, change animation program 114 determines an animation order of changing the one or more items, based on the data of the user environment. For example, if the data of the user environment indicates that the user uses one item on a webpage more frequently than other items on the same webpage, change animation program 114 gives the frequently used item more priority in the animation order; in other words, change animation program 114 determines to animate the change of the more frequently used item before the other items. An example of determining the animation order of changing the one or more items is discussed in a later paragraph with reference to FIG. 4A.

At step 209, change animation program 114 displays the first (or previous) version of the webpage. The first (or previous) version of the webpage is cached on client computer device 110 or logged on web server 120. At step 211, change animation program 114 displays a template for generating the second (or new) version of the webpage. For example, change animation program 114 displays the first (or previous) version of the webpage and the template side by side. The template keeps all other items of the first (or previous) version but without the one or more items that are changed.

At step 213, according to the animation order determined at step 207, change animation program 114 animates a change of a respective one of the one or more items. For example, on the first (or previous) version of the webpage and the template which are displayed side by side, change animation program 114 shows how the change occurs from the first (or previous) version to the second (or new) version of the webpage. An example of animation of changing the one or more items is discussed in later paragraphs with reference to FIGS. 4A-4G.

At decision block 215, change animation program 114 determines whether animation of each of the one or more items in the animation order is finished. In response to determining that animation of each of the one or more items in the animation order is not finished (NO branch of decision block 215), change animation program 114 reiterates step 213. In response to determining that animation of each of the one or more items in the animation order is finished (YES branch of decision block 215), change animation program 114 terminates the operation.

FIG. 3 is an example of an animation order of changing items on webpage 300, in accordance with an exemplary embodiment of the present invention. In this example, on the first (or previous) version of the webpage (numeral 300), five items are to be changed on the second (or new) version of the webpage. Item 301 ("Search support and downloads" section) is used frequently by the user; thus, change animation program 114 determines that item 301 is the first one to be animated. Item 302 ("Choose a product" section) is recently used by the user; thus, change animation program 114 determines that item 302 is the second one to be animated. Items 303 and 304 are used less than item 302, and item 303 is used more than item 304; therefore, change animation program 114 determines that item 303 is the third one to be animated and item 304 is the fourth one to be animated. Item 305 is a new item to be added on the second (or new) version of the webpage and may not relate to user's keywords, applications, or context currently used, so that change animation program 114 determines that item 305 is the last one to be animated.

Figure 4A:
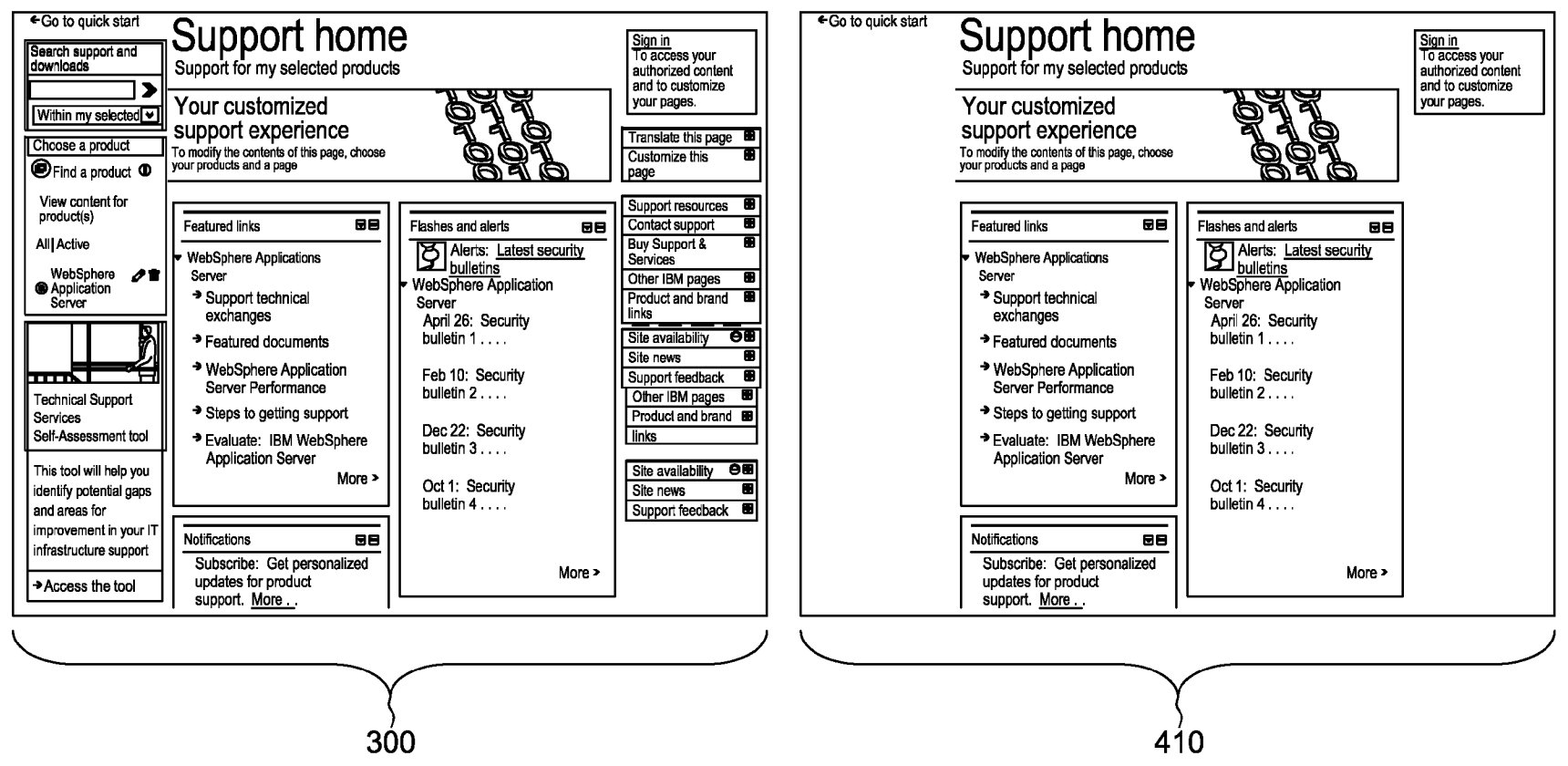
Figure 4B:
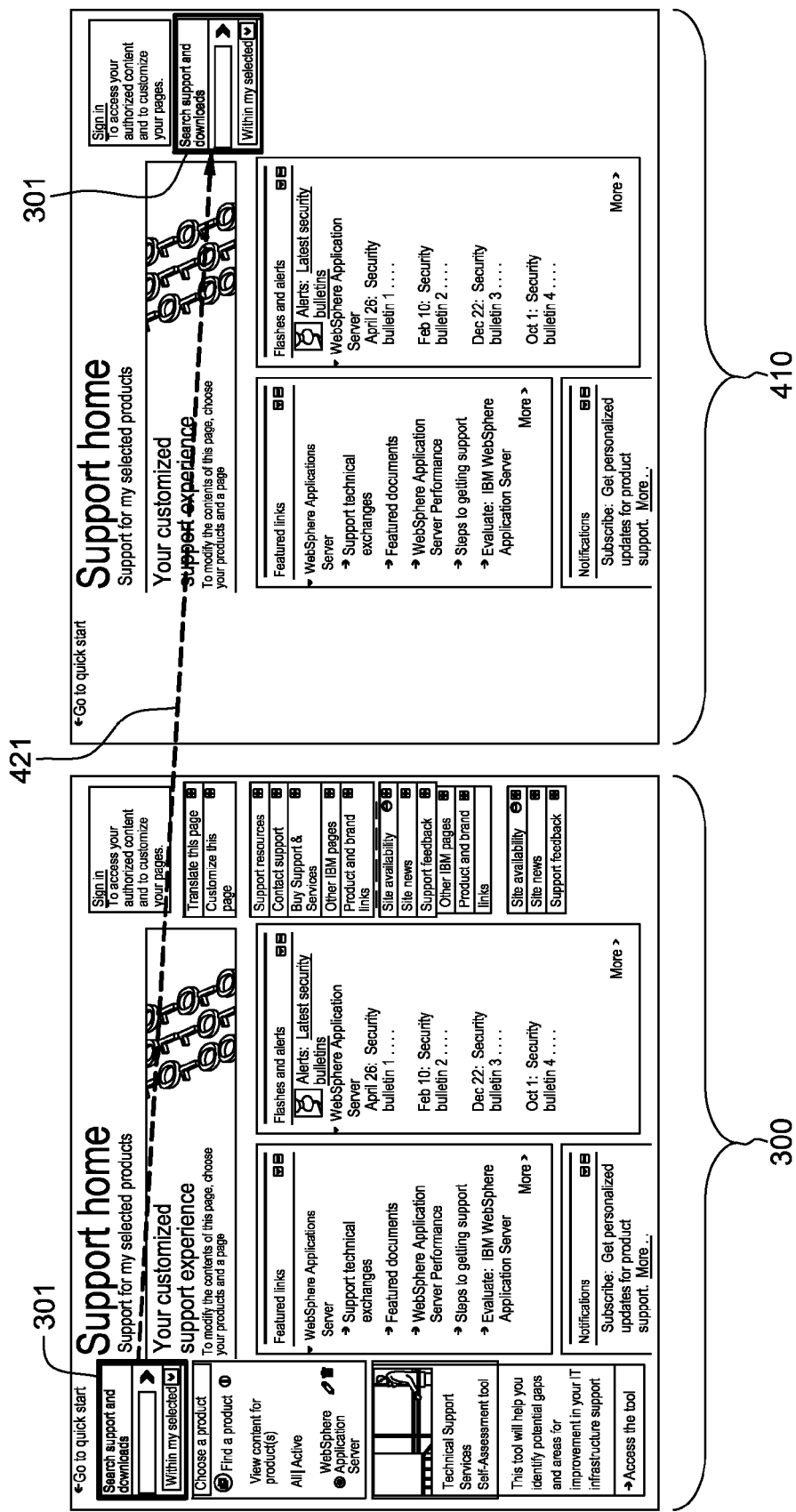

FIGS. 4A-4G illustrate an example of dynamic webpage change animation of different items in the animation order shown in FIG. 3, in accordance with an exemplary embodiment of the present invention. In this example, change animation program 114 first displays the first (or previous) version (numeral 300) of the webpage and template 410 for generating the second (or new) version of the webpage, as shown in FIG. 4A. Change animation program 114 displays the first (or previous) version (numeral 300) of the webpage after retrieving a copy of the first (or previous) version cached on client computer device 110 or logged on web server 120. The template (numeral 410) does not show items 301, 302, 303, 304, and 305 which are to be changed, but shows all other items which are not to be changed.

Figure 4C:
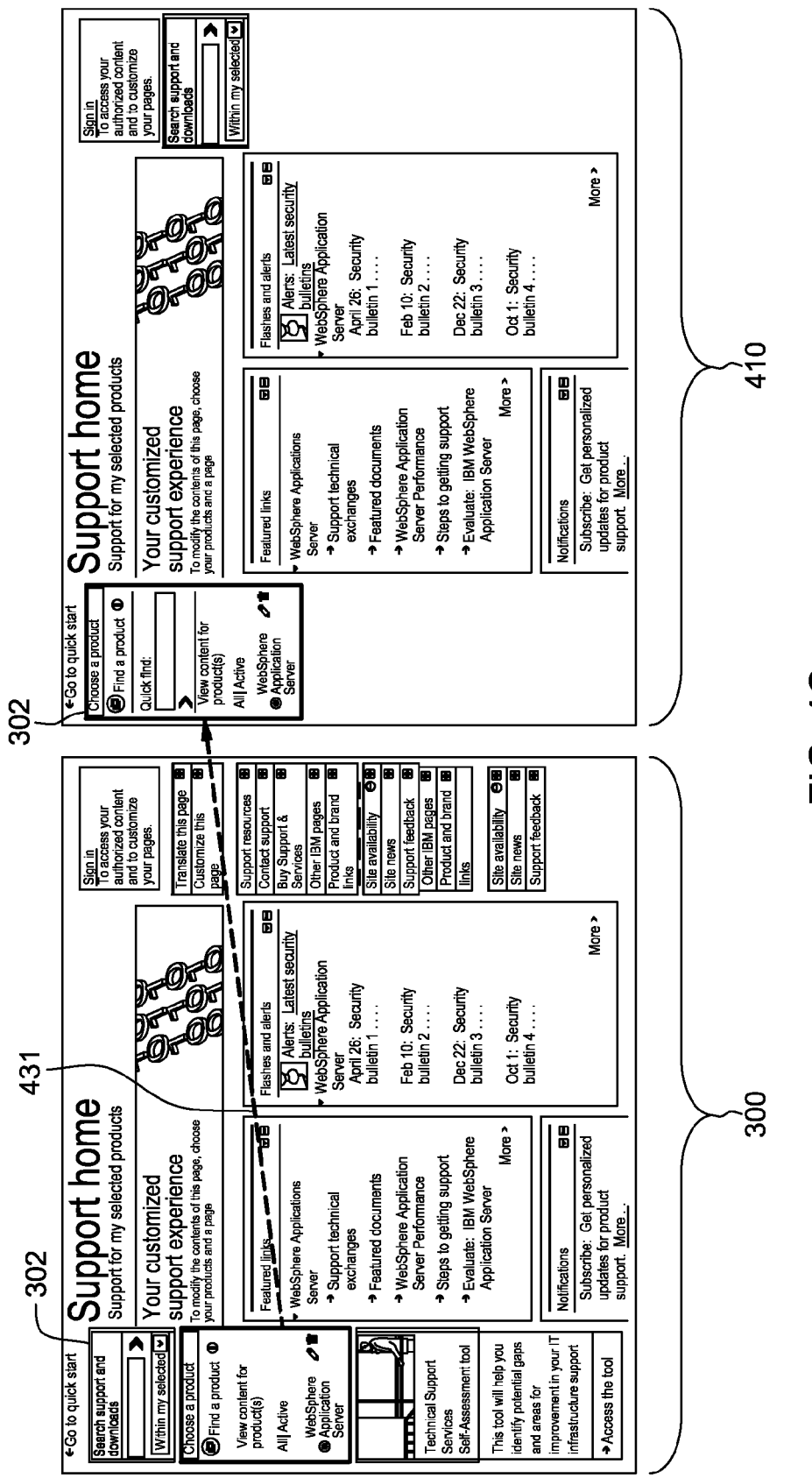
Figure 4D:
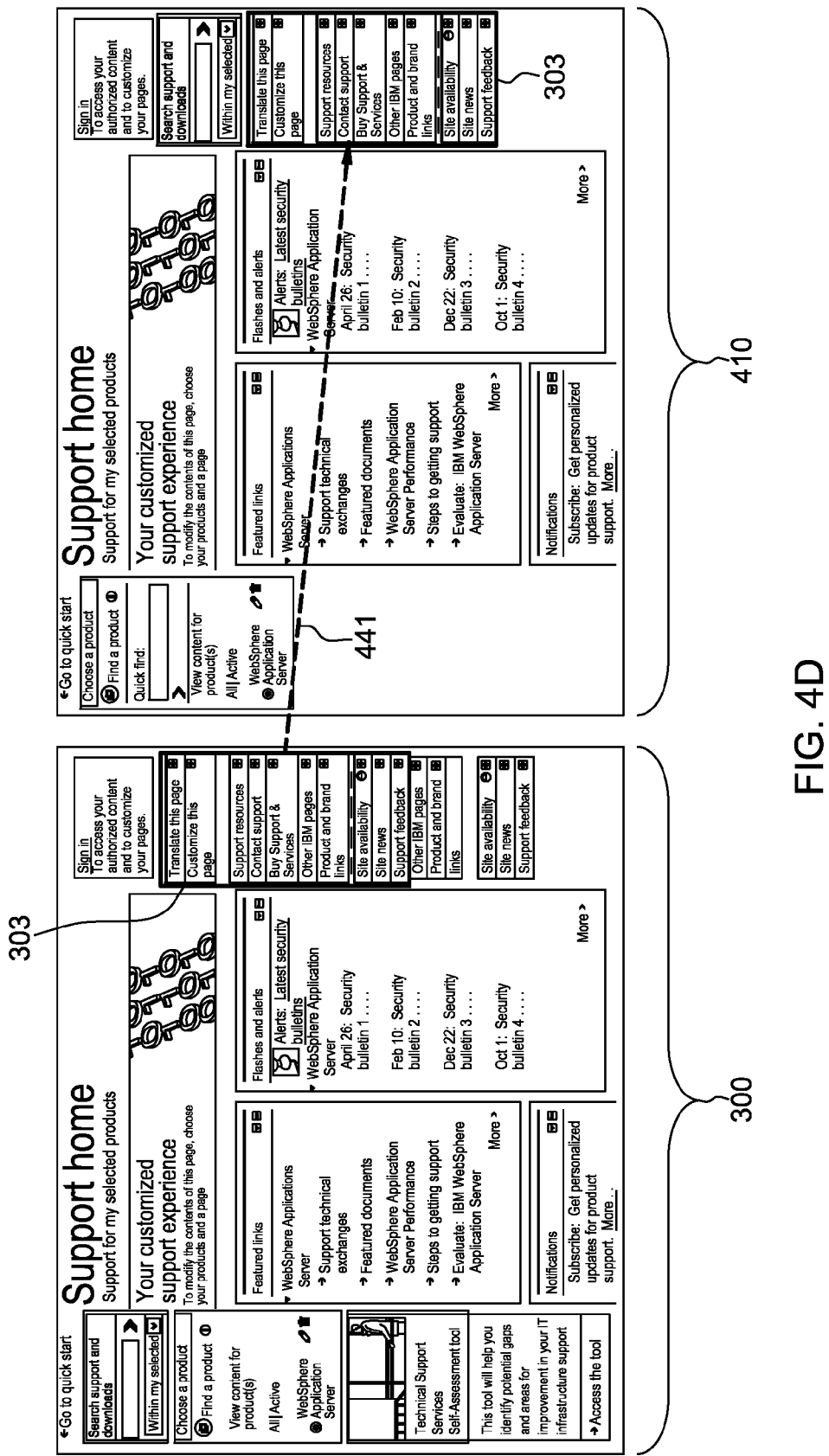
Figure 4E:
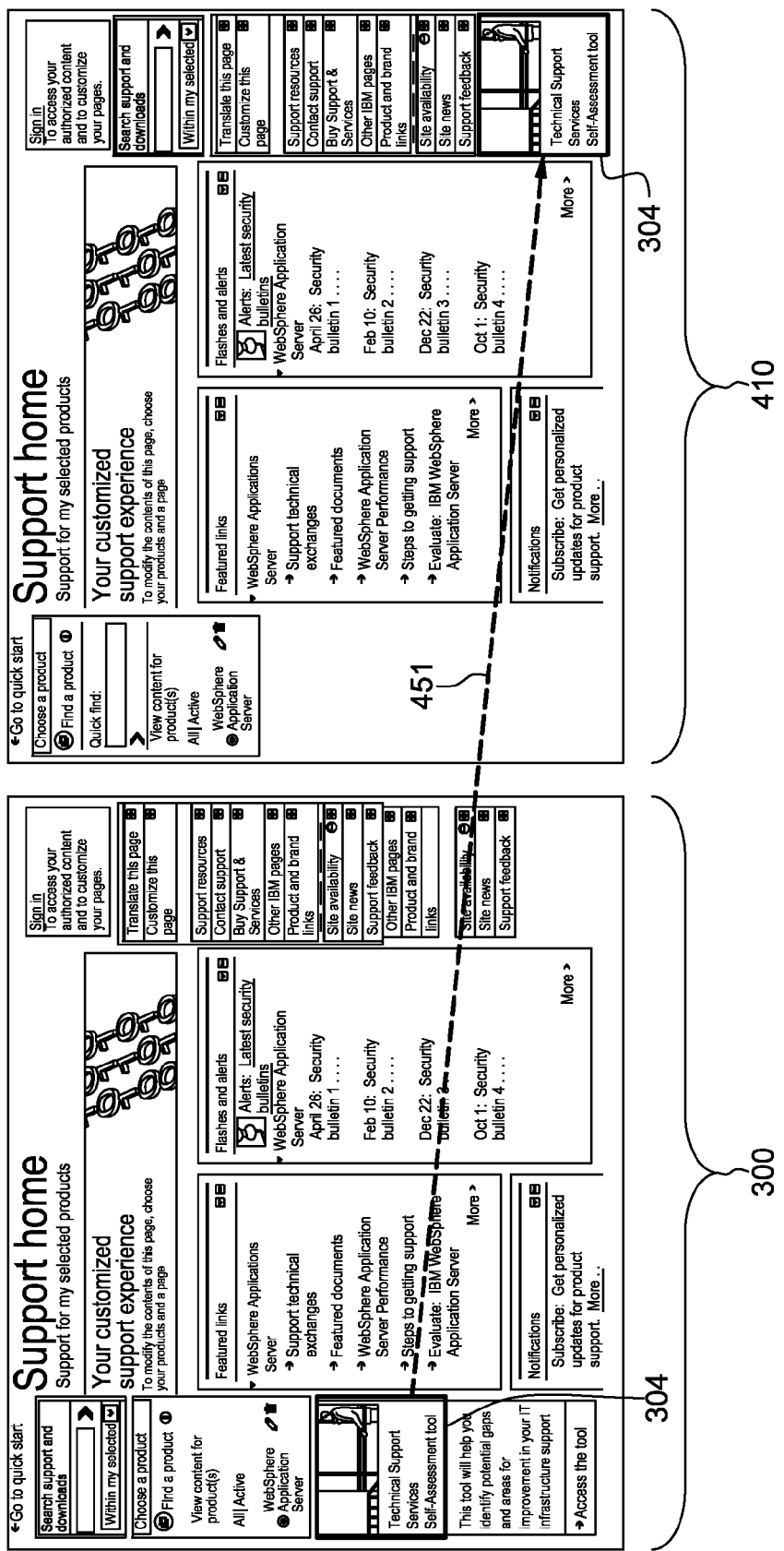
Figure 4F:
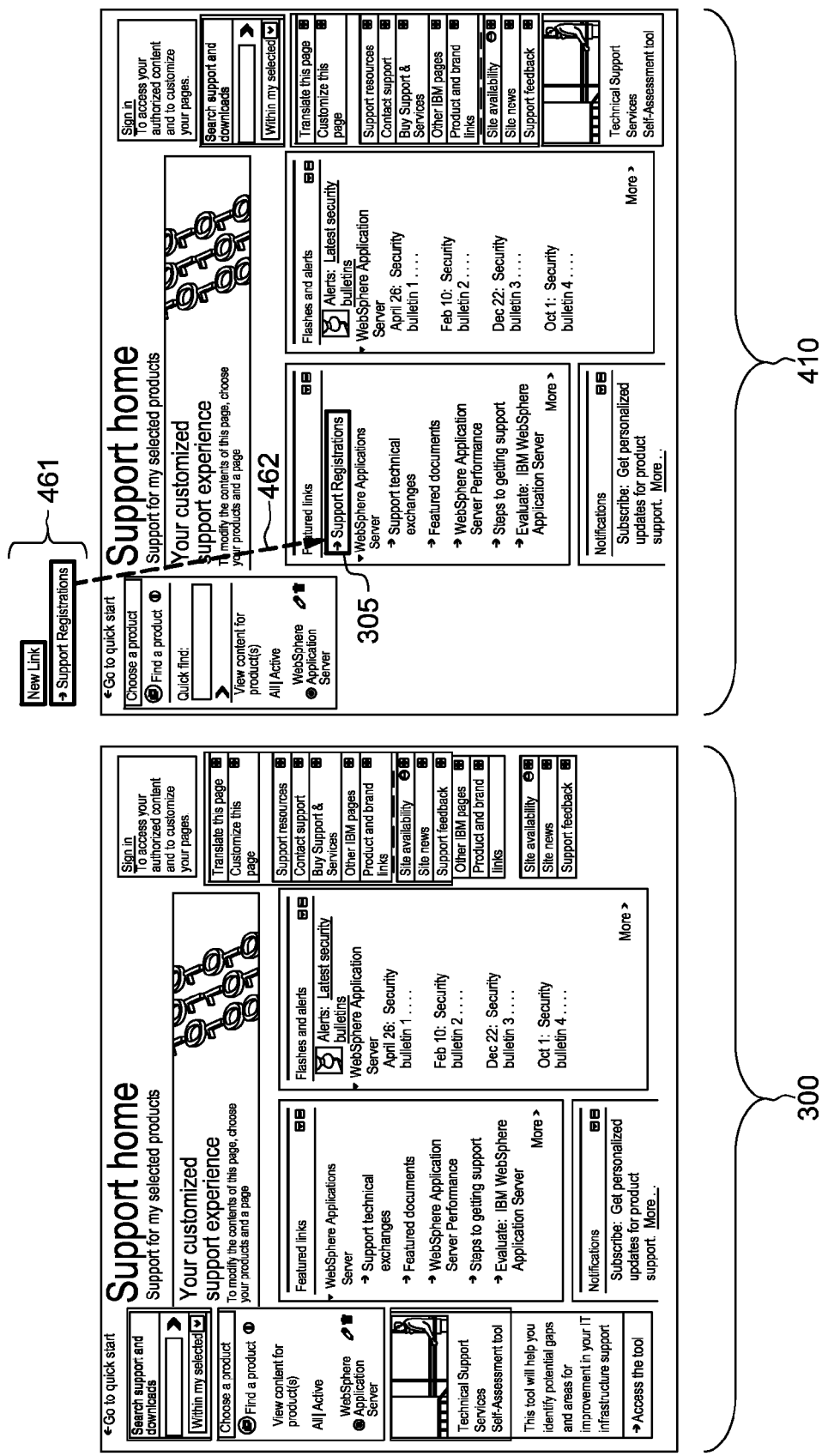
Figure 4G:
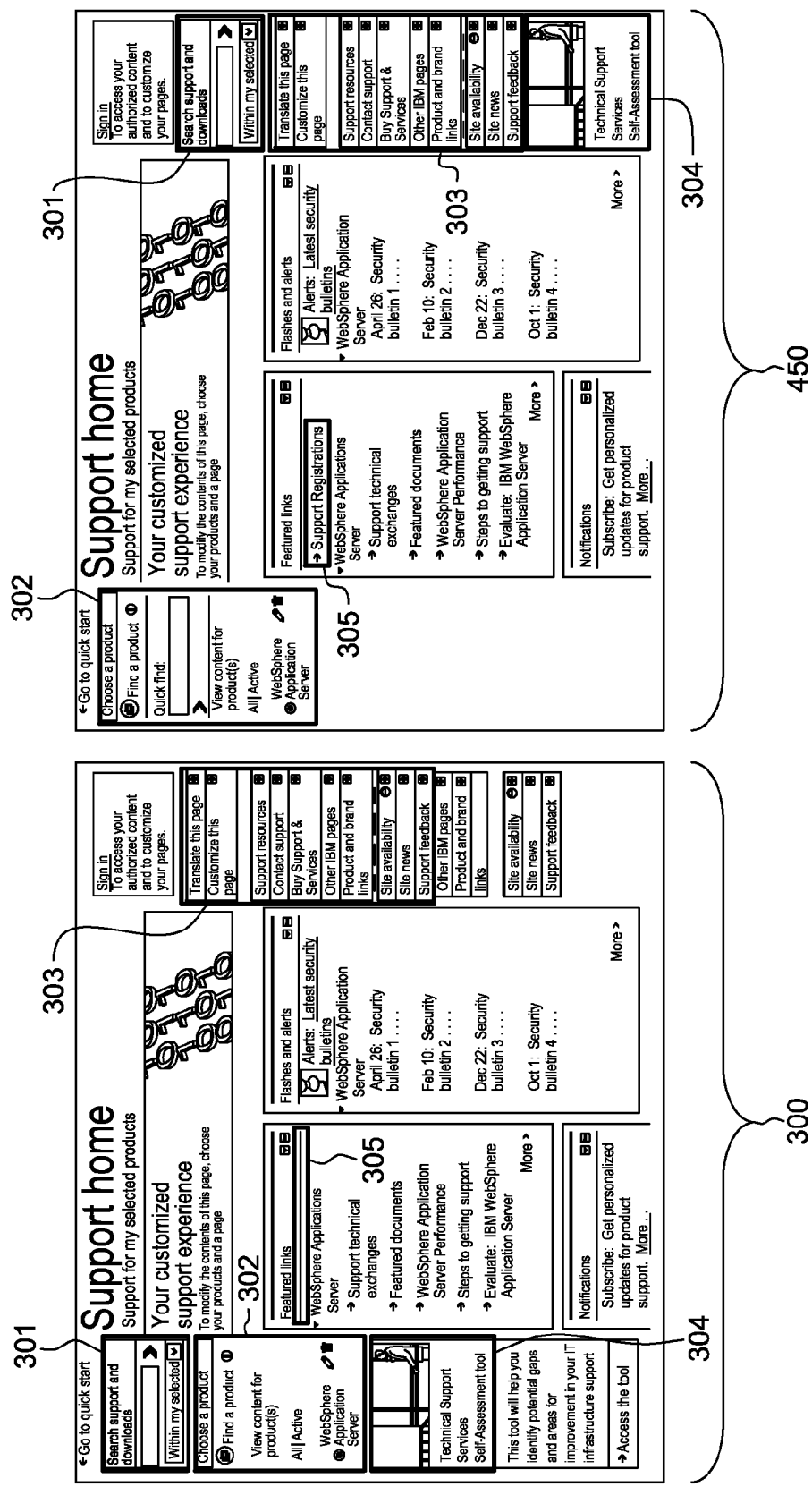

FIG. 4B shows that the new location of item 301 on template 410 is different from the location of item 301 on the first (or previous) version (numeral 300). Change animation program 114 animates item 301 moving from the location on the first (or previous) version (numeral 300) to the new location on template 410. The relocation of item 301 follows a path indicated by dashed-line 421. FIG. 4C shows that the new location of item 302 on template 410 is different from the location on the first (or previous) version (numeral 300). Change animation program 114 animates item 302 moving from the location on the first (or previous) version (numeral 300) to the new location on template 410. The relocation of item 302 follows a path indicated by dashed-line 431. FIG. 4D shows that the new location of item 303 on template 410 is different from the location on the first (or previous) version (numeral 300). Change animation program 114 animates item 303 moving from the location on the first (or previous) version (numeral 300) to the new location on template 410. The relocation of item 303 follows a path indicated by dashed-line 441. FIG. 4E shows that the new location of item 304 on template 410 is different from the location on the first (or previous) version (numeral 300). Change animation program 114 animates item 304 moving from the location on the first (or previous) version (numeral 300) to the new location on template 410. The relocation of item 304 follows a path indicated by dashed-line 451. FIG. 4F shows addition of item 305 which is a new item on the second (or new) version of the webpage. Change animation program 114 shows content 461 of new item 305 on the top of template 410 and animates content 461 of new item 305 moving into template 410. Content 461 of new item 305 moves into template 410 following a path indicated by dashed-line 462. For removal of an item, change animation program 114 may animate the removal by showing disappearance of the item on the first (or previous) version (numeral 300) or by showing the item's moving to a symbolized area such as a garbage can. FIG. 4G shows both the first (or previous) version (numeral 300) and the second (or new) version (numeral 450) of the webpage. After the animation, change animation program 114 shows all the changed items on the second (or new) version (numeral 450) of the webpage.

Figure 5:
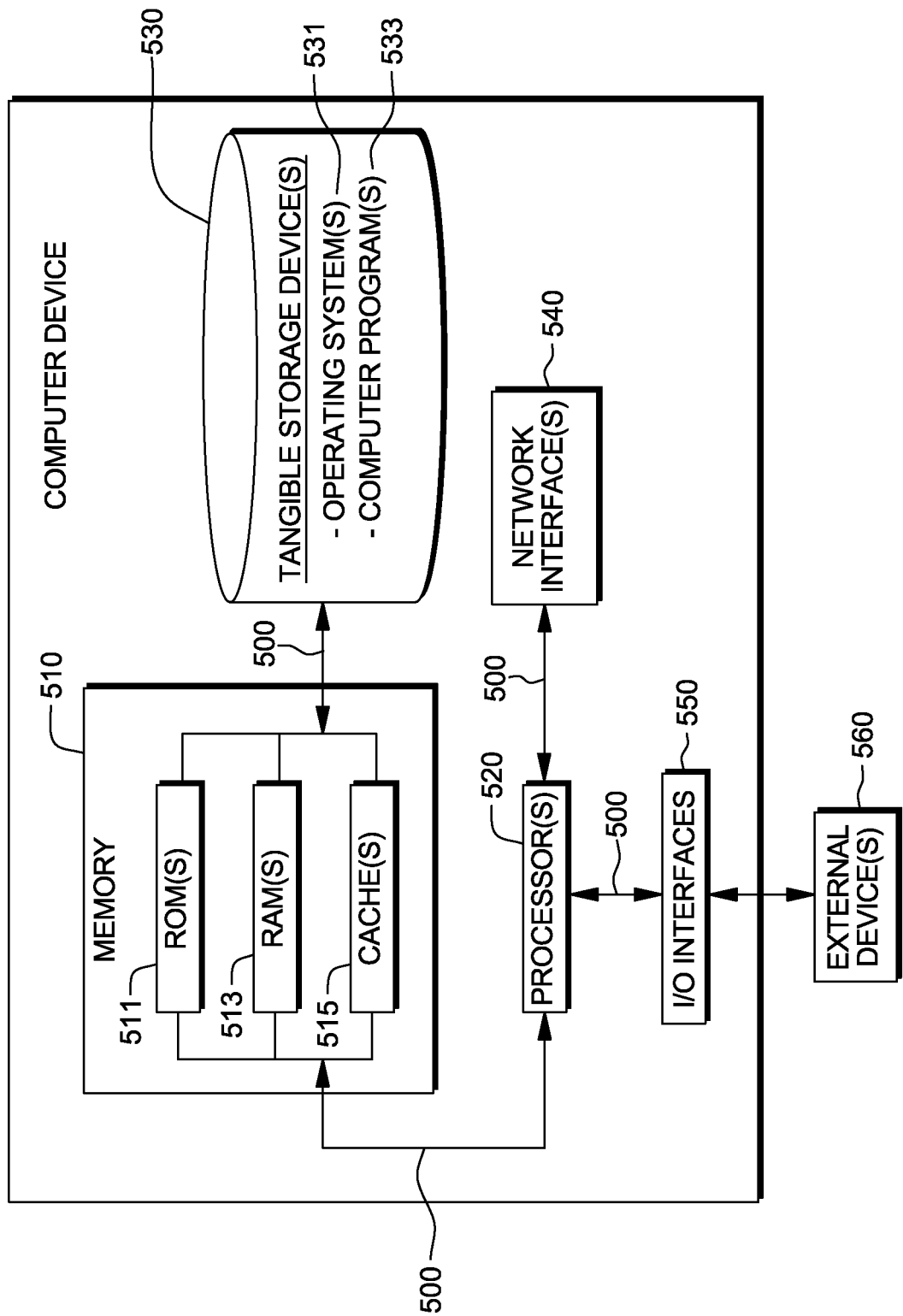
FIG. 5 is a diagram of components of a computer device hosting the system for dynamic webpage change animation shown in FIG. 1, in accordance with an exemplary embodiment of the present invention.

FIG. 5 is a diagram of components of a computer device hosting the system for dynamic webpage change animation shown in FIG. 1, in accordance with an exemplary embodiment of the present invention. It should be appreciated that FIG. 5 provides only an illustration of one implementation and does not imply any limitations with regard to the environment in which different embodiments may be implemented.

Referring to FIG. 5, the computer device includes communications fabric 500 which provides communications among processor(s) 520, memory 510, tangible storage device(s) 530, network interface(s) 540, and I/O (input/output) interface(s) 550. Memory 510 includes ROM(s) (Read Only Memory) 511, RAM(s) (Random Access Memory) 513, and cache(s) 515.

One or more operating system(s) 531 and one or more computer program(s) 533 reside on one or more computer-readable tangible storage device(s) 530. In the exemplary embodiment, change animation program 114 resides on one or more computer-readable tangible storage device(s) 530 of the computer device.

The computer device further includes I/O interface(s) 550. I/O interface(s) 550 allow for input and output of data with external device(s) 560 that may be connected to the computer device. The computer device further includes network interface(s) 540 for communications between the computer device and a computer network.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for dynamic webpage change animation, the method implemented by a computer system, the method comprising:
    detecting one or more items that are changed on a second version of a webpage relative to a first version of the webpage;
    generating, from the first version of the webpage, a template, wherein the template includes all items on the first version other than the one or more items that are changed on the second version;
    determining an animation order of changing the one or more items, based on user environment;
    displaying the first version of the webpage, wherein the first version of the webpage is retrieved from at least one of a client side and a server side;
    displaying the template for generating the second version of the webpage; and
    animating, on the first version of the webpage and the template for generating the second version of the webpage, changes of the one or more items by showing relocation of the one or more items from one or more location on the first version to one or more locations on the second version, according to the animation order.

2. The method of claim 1, further comprising: animating one or more new items moving in the second version of the webpage.

3. The method of claim 1, further comprising: animating removal of one or more items that are excluded from the second version of the webpage.

4. The method of claim 1, further comprising:
    acquiring data of user environment which includes at least one of context, keywords, and applications currently used by a user.

5. The method of claim 1, further comprising:
    acquiring a copy of the first version of the webpage that is cached on a client side or logged on a server side.

6. The method of claim 1, further comprising:
    adjusting a speed of animating the changes of the one or more items.

7. A computer program product for dynamic webpage change animation, the computer program product comprising:
    one or more computer-readable tangible storage devices and program instructions stored on at least one of the one or more computer-readable tangible storage devices, the program instructions comprising:
    program instructions to detect one or more items that are changed on a second version of a webpage relative to a first version of the webpage;
    program instructions to generate, from the first version of the webpage, a template, wherein the template includes all items on the first version other than the one or more items that are changed on the second version;
    program instructions to determine an animation order of changing the one or more items, based on user environment;
    program instructions to display the first version of the webpage, wherein the first version of the webpage is retrieved from at least one of a client side and a server side;
    program instructions to display a template for generating the second version of the webpage; and
    program instructions to animate, on the first version of the webpage and the template for generating the second version of the webpage, changes of the one or more items by showing relocation of the one or more items from one or more locations on the first version to one or more locations on the second version, according to the animation order.

8. The computer program product of claim 7, further comprising program instructions to animate one or more new items moving in the second version of the webpage.

9. The computer program product of claim 7, further comprising program instructions to animate removal of one or more items that are excluded from the second version of the webpage.

10. The computer program product of claim 7, further comprising:
    program instructions to acquire data of user environment which includes at least one of context, keywords, and applications currently used by a user.

11. The computer program product of claim 7, further comprising:
    program instructions to acquire a copy of the first version of the webpage that is cached on a client side or logged on a server side.

12. The computer program product of claim 7, further comprising:
    program instructions to adjust a speed of animating the changes of the one or more items.

13. A computer system for dynamic webpage change animation, the computer system comprising:
    one or more processors, one or more computer-readable tangible storage devices, and program instructions stored on at least one of the one or more computer-readable tangible storage devices for execution by at least one of the one or more processors, the program instructions comprising:
    program instructions to detect one or more items that are changed on a second version of a webpage relative to a first version of the webpage;
    program instructions to generate, from the first version of the webpage, a template, wherein the template includes all items on the first version other than the one or more items that are changed on the second version;
    program instructions to determine an animation order of changing the one or more items, based on user environment;
    program instructions to display the first version of the webpage, wherein the first version of the webpage is retrieved from at least one of a client side and a server side;
    program instructions to display a template for generating the second version of the webpage; and
    program instructions to animate, on the first version of the webpage and the template for generating the second version of the webpage, changes of the one or more items by showing relocation of the one or more items from one or more locations on the first version to one or more locations on the second version, according to the animation order.

14. The computer system of claim 13, further comprising program instructions to animate one or more new items moving in the second version of the webpage.

15. The computer system of claim 13, further comprising program instructions to animate removal of one or more items that are excluded from the second version of the webpage.

16. The computer system of claim 13, further comprising:
   program instructions to acquire data of user environment which includes at least one of context, keywords, and applications currently used by a user; and
   program instructions to acquire a copy of the first version of the webpage that is cached on a client side or logged on a server side.

17. The computer system of claim 13, further comprising:
   program instructions to adjust a speed of animating the changes of the one or more items.

\* \* \* \* \*